(12) United States Patent
Davis et al.

(10) Patent No.: US 7,039,704 B2
(45) Date of Patent: May 2, 2006

(54) BUSINESS PLATFORM WITH NETWORKED, ASSOCIATION-BASED BUSINESS ENTITY ACCESS MANAGEMENT AND ACTIVE CONTENT WEBSITE CONFIGURATION

(75) Inventors: Lee M. Davis, Federal Way, WA (US); Robert M. Spearman, Seattle, WA (US); Robert C. Combs, North Bend, WA (US)

(73) Assignee: The Cobalt Group, Inc., Seattle, WA (US)

( * ) Notice: Subject to any disclaimer, the term of this patent is extended or adjusted under 35 U.S.C. 154(b) by 293 days.

(21) Appl. No.: 10/350,796

(22) Filed: Jan. 24, 2003
(Under 37 CFR 1.47)

(65) Prior Publication Data

US 2004/0148409 A1 Jul. 29, 2004

(51) Int. Cl.
*G06F 15/173* (2006.01)

(52) U.S. Cl. .................. 709/225; 709/203; 709/219; 709/226; 709/229

(58) Field of Classification Search ............... 709/229, 709/202–203, 217–219, 223–226
See application file for complete search history.

(56) References Cited

U.S. PATENT DOCUMENTS

| | | | | |
|---|---|---|---|---|
| 5,835,712 A | * | 11/1998 | DuFresne | 709/203 |
| 5,862,346 A | * | 1/1999 | Kley et al. | 709/245 |
| 5,987,506 A | * | 11/1999 | Carter et al. | 709/213 |
| 6,055,541 A | * | 4/2000 | Solecki et al. | 707/10 |
| 6,185,614 B1 | * | 2/2001 | Cuomo et al. | 709/224 |
| 6,401,103 B1 | * | 6/2002 | Ho et al. | 707/201 |
| 6,473,849 B1 | * | 10/2002 | Keller et al. | 712/30 |
| 6,571,253 B1 | * | 5/2003 | Thompson et al. | 707/100 |
| 6,629,148 B1 | * | 9/2003 | Ahmed et al. | 709/238 |
| 6,643,663 B1 | * | 11/2003 | Dabney et al. | 707/102 |
| 6,697,825 B1 | * | 2/2004 | Underwood et al. | 715/530 |
| 6,823,359 B1 | * | 11/2004 | Heidingsfeld et al. | 709/203 |
| 6,826,594 B1 | * | 11/2004 | Pettersen | 709/203 |
| 6,871,216 B1 | * | 3/2005 | Miller et al. | 709/206 |
| 6,965,968 B1 | * | 11/2005 | Touboul | 709/229 |

* cited by examiner

*Primary Examiner*—Bharat Barot

(74) *Attorney, Agent, or Firm*—Stoel Rives LLP (57) ABSTRACT

The invention provides a business platform, a business entity management system, and a software module that can be used in conjunction with the software service framework. The invention mimics actual business relationships between business entities, and uses a software service module to configure the business entities into a network that comprises at least three generations of business entities, wherein role dependent associations mimicking real life business relationships are established between the business entities. The invention provides management of active content in a website and allows modification of the content by different business entities. Control of the active content is determined by precedence of the business entities.

23 Claims, 4 Drawing Sheets

BUSINESS PLATFORM WITH NETWORKED, ASSOCIATION-BASED BUSINESS ENTITY ACCESS MANAGEMENT AND ACTIVE CONTENT WEBSITE CONFIGURATION

COPYRIGHT NOTICE

© 2003 Cobalt Group, Inc., Seattle, Wash. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The invention relates to software business platforms that provide a means for information sharing between separate business entities, and/or within these business entities. The invention further relates to web site configuration and content control by separate business entities.

BACKGROUND OF THE INVENTION

In a rapidly changing high technology business environment where information management of the business organization is often a critical factor in maintaining competitiveness, it has become increasingly necessary for businesses to adopt software business platforms in an effort to enable the efficient sharing of information within a corporation. Typically, such platforms have a database that stores corporate information, business application software for its business functions (typically Finance, Sales, Marketing, etc.) a security or user access system that controls access to the information by a number of users that are assigned roles that permit or deny access to the information, based on the assigned role of the individual, and a system bus that provides an interface permitting the various components of the system to communicate with each other according to certain protocols. However, in many instances, these business platforms may have developed separately over time so that the various modules relating to business functions, such as marketing and sales, may have different configurations, and may be coded in different software languages, thereby complicating communication between the modules and adding complexity to information sharing between corporate divisions and the generation of reports for management. Further, as business organizations grow in size, complexity and need for more information sharing, the business platforms and modules often lack sufficient scalability to keep pace.

The issues that pertain to intra-business software platforms is further complicated when the business platform is one that serves a variety of separate business entities, that may be independent corporations, partnerships or other business entities, and that may be hosted by a third party. For a variety of reasons, it may be desirable for these separate and independent business entities to share information. For example, in a franchise operation, it may be desirable for franchisees (that are independent corporations) to share information with a franchisor, and it may also be necessary for and desirable for franchisees in a regional area to share information between themselves, with regard to certain functions, such as marketing, but perhaps not with regard to other functions, such as finance. This would be further complicated if several franchise operations were to share the same platform, hosted by a third party. Clearly, information sharing between franchises would not be desired or allowed but some franchisees might hold multiple franchises. Accordingly, the sharing of information is not only complicated due to the separate business entities involved, but also the degree and extent of information sharing that is required.

Further, in an inter-business software platform, that may be hosted by a third party, it might be expected that the separate business entities may each have before hand developed their own business modules, for example each might already have developed their own marketing, sales, accounting and web management modules, before the advent of the hosted platform. There may be a considerable difference between the nature, configuration, language, etc. of the modules between the businesses that must now share certain information. This presents highly complex integration and information sharing issues to be resolved.

Business entities participating in an inter-business platform may share common web content on their individual websites with similar web content. Maintaining uniform and consist web content is an important aspect of marketing, customer relationships, and overall business strategy. This is especially true for franchises and related dealers of goods and services. The cost of developing web content is also reduced if it is distributed between related business entities. Given the amount of electronic transactions and research performed over the Internet, web content may be the primary source of information about a business entity for some customers. Indeed, a website may constitute most, if not all, of the interaction that a customer may have with a business entity.

Although websites for related business entities have common web content and a common layout, some of the content may need to be altered for individual websites. As can be appreciated, each business entity has considerations specific to their situation. Thus, some web content needs to be accessible by different business entities for modification. However, access and control of certain web content must be ensured to provide quality and uniformity to a customer base.

SUMMARY OF THE INVENTION

The invention provides: a business platform having a unique business entity management module; a business entity management system; and a software module for controlling user access to and manipulation of information shared by users through a common platform.

The business platform of the invention includes a service framework that supports business applications, and that is supported by at least one service module. The service module controls access, and the extent of information manipulation, by business entities who use the service framework, through users with assigned roles.

In accordance with the invention, the service module arrays the business entities as a user role-dependent network of associated business entities by mimicking actual business relationships. The network is contextual in that the associations are role-dependent and vary depending upon the user's role, reflecting the real world circumstance that various business functions need different information, often obtained from different sources. In one embodiment, the network includes at least three generations of business entities, and is configured such that associations are established between at least some business entities in neighboring generations, and also between at least some business entities in non-neighboring generations.

Further, information that is accessible through the service framework are defined by business objects. These business objects are configured to permit or deny access based on the role of the user, and if the user is permitted access, to specify the extent to which a user is allowed to manipulate the information (e.g. view only, edit, delete, create, modify, aggregate, etc.). Accordingly, a duly authenticated user that logs onto the service framework, in the role of an associate of a business entity, is permitted or denied access to the business objects, based on the role of the user and whether the user's business entity has an association with the owner of that business object. Further, the extent of manipulation of business objects to which access is permitted is also controlled, based on the configuration of the business object with regard to the role of the user.

The invention also provides a business entity management system for permitting or denying a business entity access to information of other business entities, where a plurality of entities use a common business platform. The system includes arraying the business entities as a role-dependent network of associated business entities, where the associations mimic actual business relationships and needs for information sharing, as explained above. In one embodiment, the network includes at least three generations of grouped business entities, the network is also configured such that associations are established between at least some of the business entities in neighboring generations, and between at least some of the business entities in non-neighboring generations. The system is fully recursive so that accessing by a first business entity from a second business entity, for example, will also potentially access information of any additional business entities associated with the second, depending upon permission rules relating to roles and business objects. As discussed above, the system also controls user access to information by using the role of the user, the business object configuration, and the networked associations to permit or deny access.

The invention also provides a software module that can be used in conjunction with a service framework. The service module includes means for communicating with the service framework, such as an interface. It also includes means for configuring a plurality of business entities to control business entity access to information and extent of information manipulation, if access is permitted. The module uses the roles and related business associations, and the configuration of the business objects (that represent information), to permit or deny access and extent of manipulation of information by a user.

The business platform of the invention is scalable in that it permits ready addition of business entities and business and service modules. New business entities are added with relative ease after business relationships of its users are established because the associations with other business entities used in the role-based networked system are based on these relationships and needs. The recursive nature of the business entity management module further simplifies addition of a new business entity in that only direct associations within the same generation and closest neighboring generations need to be established. All others are automatically available via these initially established associations. The platform is furthermore flexible in supporting legacy applications through use of interfaces. The platform can find application in a wide variety of businesses, and may or may not be hosted by a third party for businesses that need to share some (but not all) information for enhanced productivity, marketing, sales economies of scale and overall competitiveness.

The invention further provides a server for operable communication with customers at remote desktops over a network. The server hosts web content containing static content and active content. The server includes a memory to store websites containing the web content and a website manager to render websites with the static content and active content in fixed locations relative to one another. An active content configuration module is a tool within the website manager to enable modification of the active content. The configuration module receives user requests to modify certain active content and determines if the active content has been locked by another business entity or business group. If the active content is locked, then the configuration module compares the precedence of the user request to the precedence of the lock. A higher precedence controls modification of the active content.

Additional aspects and advantages of this invention will be apparent from the following detailed description of preferred embodiments, which proceeds with reference to the accompanying drawings.

DETAILED DESCRIPTION OF PREFERRED EMBODIMENTS

In accordance with the invention, it has now been recognized that a software business platform should have certain attributes in order to provide enhanced functionality. These attributes includes scalability, flexibility, the capability to successfully integrate legacy systems, the ability to permit individual users to make changes and to customize certain business application modules (for example those relating to the website of the individual user), and data control that preferably mimics the actual business relationships between parties that have access to the information shared through the business platform. This mimicking should not only take into account which party (business entity) shares information with which other party, but also the extent of information shared and that the extent of sharing may be dependent on the nature of the information and the role of the user (who is typically an employee of a business entity). Thus, for example, while certain business entities may wish to share all inventory information ("inventory business objects") about certain products through their respective sales managers, they may not want to share that information for all products; and while they might want to share certain marketing information ("marketing business objects") through their respective marketing managers, other marketing information might not be shared. Further, information sharing may be dependent upon business entity type. Thus it may be unrestricted from one business entity type to another (e.g.: franchisee to franchisor) but otherwise restricted when information flow is reversed (e.g. franchisor to franchisee) and further customized for other business relationships (e.g: franchisee-franchisee; vendor-franchisee, etc.).

The invention provides a business software platform that Includes the features described above. It is scalable in that it can be extended, with minimal effort, to include large multiples of users on the same platform. Further, the platform is also scalable in the sense that it is readily extendable to support multiples of business applications, including but not limited to applications relating to marketing, sales, finance, website management, and such other business functions as are necessary or desired. Further, the platform of the invention may be used with "legacy" modules through the use of interfaces, either a core service interface, a business interface, or an object interface to communicate through the system bus, as discussed below. The business platform also permits individual users (within business entities) that have system permission to modify data, and to customize aspects of data presentation, such as in report generation and website management. The platform is configured to set up associations between business entities that mimics real life business relationships between the businesses and to allow, deny or restrict information (business objects) access and sharing based on these relationships. ["Relationship" refers to a real life business context and "association" refers to the software context.] The extent of information sharing (or denial of access to information) is controlled through the configuration of the business objects representing the information and whether that configuration permits access by a certain user and the limits to his/her access; for example rights to create, view only, edit, copy, amend aggregate into a report, or supplement the information, as further explained below.

To the extent that the business platform is a hosted platform for a large number of separate business entities, the platform permits reduction in overhead costs, maintenance costs, new user add in costs, and provides better integration (and system stability) through the use of a single unified architecture.

Figure 1:
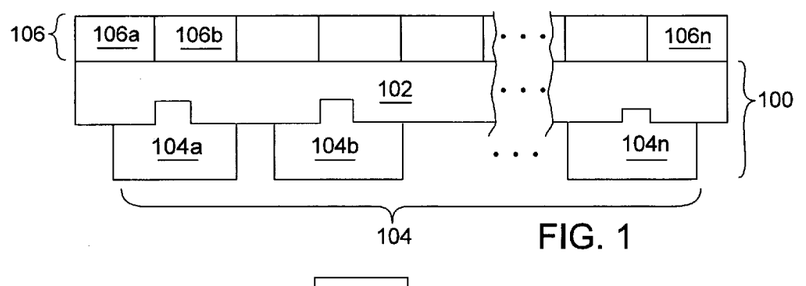
FIG. 1 is a diagrammatic representation of an example of a business platform in accordance with the invention.

An example of the business platform of the invention is shown in a simplified, illustrative sketch, FIG. 1. The platform 100 includes a service framework 102, and a series of service modules 104. The framework 102 is immediately aware of services that are connected to it, and provides messaging and other core services to the connected services. Every service on the business platform has authenticated access to potentially use any other service on the framework, regardless of the location of that service.

Of the service modules 104, two will be discussed here below, although it should be understood that additional service modules may be added, as needed for particular uses and applications of the platform. As shown, the example of the platform includes a core service module 104a and a business service module 104b. This combination of service framework 102 and service modules 104 forms a platform 100 that supports a wide variety of business applications 106. These applications will vary depending upon the nature of the businesses being supported. Generally, however the applications relate to core business functions, such as Sales, Marketing and Finance, and thus include, but are not limited to inventory management, data warehousing and data mining, and the like applications. An example of each of the core and business service modules is discussed in more detail, here below.

It should be understood that the business platform 100 may be used as either a business platform that hosts a wide variety of separate business entities that have a need to share information, or may be used by a single business entity that might have a plurality of separate users. For example, in the intra-business context, the business platform may be useful to a retail department business organization that has department stores in various geographic locations. Consequently, one might expect the individual department stores to have a need to share information with a (local) regional office, and for all regional offices to share information with a corporate headquarters. Further, there may be a need to share information between regional offices, and a need to share information between department stores in various locations for various business purposes. Further, the platform can support several retail department stores that are totally separate organizations. Thus a third party could for example host a platform for such organizations as Neiman Marcus, Nordstrom and Walmart. Accordingly, the business platform is flexible and fully adaptable to the needs of a variety of structured business relationships, either within a business organization, or between a large number of separate business organizations that share a hosted platform.

Returning to FIG. 1, the architecture of the business platform of the invention is preferably a tightly integrated extension of the Sun Microsystems™ (Sunnyvale, Calif.) J2EE software platform. Every feature of J2EE is available to services conforming to the business platform interfaces. The business platform is preferably an application server that runs on J2EE servers; e.g. Weblogic (a product and trademark of BEA Systems) or Websphere (a product and trademark of IBM Corporation), although other such equivalent servers are also useful. These servers provide a variety of benefits including but not limited to:

Investment protection from extensible, industry standard, cutting-edge technology.

A scalable technology solution that streamlines processes and reduces maintenance costs.

A flexible security model that allows system administrators to authorize designated users for different tasks.

Platform independence (runs on Unix, Mainframe, PC, etc.).

Internationalized software capabilities that allow for rapid and efficient localization.

By building on the design concepts described in the above sections, the invention has been able to create a suite of tools for business users. An overview of each of those services, as well as the business platform follows.

The first business platform service type, Core Services, provides the underlying service infrastructure of the business platform. Core Services may provide, for example, such functionality as:

Service Protocols: Allows connection into the business platform via protocols such as HTTP, HTTPS, RMI, SMTP, JMS, and SOAP.

Discovery/Location: Advertises the business platform services that can be securely defined, discovered and integrated in the business platform framework. This direct service-to-service integration over the business platform is a core building block of the business platform-based applications.

Naming: Provides a naming service for the object discovery mechanism.

Authentication/Security: Provides authentication for users, applications, and services that want to use other services of the framework.

Internationalization: The business platform preferably adheres to Sun MicroSystems' "i18n" standards or equivalent for internationalization and localization. Textual messages are stored outside the source code so new language support does not require re-compilation. Culturally-dependent data, such as dates and currencies, appear in formats that conform to the user's region and language.

Transaction Handling: When applications invoke transactions across the business services, they have to be able to access data across those services. Transaction handling provides the two-phase commit mechanism to support distributed transactions.

Messaging: Provides messaging services that allow identical communications both internally within the framework and externally with outside applications.

Persistence: Saves data to underlying persistent storage (most commonly these are relational databases).

The second business platform service type shown in FIG. 1 is the Business Service Module 104b. Business Services are all the different types of business functionality that are available to the business platform users. The business platform may have a number of pre-packaged Business Services. Or business entities (or other software developers) can create Business Services. These business services are clearly somewhat dependent upon the nature of the businesses being served. For example, in a hosted platform in the automotive area, linking dealers, regional dealer groups and manufacturers ("OEMs"), non limiting examples of the business platform Business Services Modules may be:

Configuration (an application that configures autos, used by potential customers)

Inventory Management

Lead Manager (manages new potential sales leads)

Traffic Reporting (website visitation analysis and reports)

Asset Library Management (digital media repository)

Website Management

Logging

Clearly, for other types of businesses, these services may vary from the above listing. Each of the Business Services may constructed using whatever language or technology the business entity desires; only the business platform interface of the invention is required to be implemented by all the business platform services. The interface is defined as a common Java Object, as well as a standardized specification by which the service is implemented.

The Business Service communicates with and across the business platform via bus interfaces and object interfaces. The framework 102 can support any piece of functionality that a business entity would like to use with the business platform, as long as these interfaces are implemented. For example, if a business entity preferred to use its own configurator rather than any of the configurators that a hosted system provides, it could do so by creating a configuration business service that integrates with the business platform framework and object interfaces that the host publishes and documents. The ability to interact with the framework via this set of interfaces enables the business entities to each change out applications modules at any time.

In addition to the interfaces, each Business Service 104b needs and uses a Core Service 104a. Each Core Service 104a provides an interface that allows it to be used by the Business Service in a standard way. For example, a Business Service might use the persistence and security Core Services, and would use Core Service interfaces that allow for that communication via Application Programming Interfaces.

Figure 2:
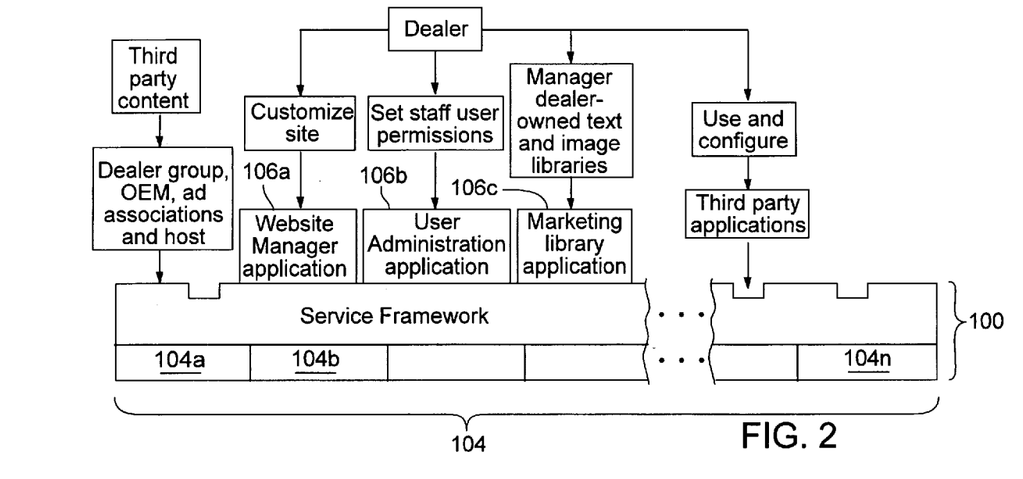
FIG. 2 is a diagrammatic representation of an example of a business platform in accordance with the invention, in the automotive business context.

The illustrative example of a platform in accordance with the invention shown in FIG. 2, relates in particular to the automotive industry from the perspective of a particular dealer. It should be understood that the illustrative example of the platform of the invention is a hosted platform, in which services are provided to dealers, regional dealer groups, and manufacturers ("original equipment manufacturers" or "OEMs"). The OEMs include manufacturers of automobiles, as well as manufacturers of components supplied as original equipment, such as tires, parts, audio equipment, and the like. As shown in FIG. 2, the platform 100 includes both the service framework 102 and core services 104, as described in relation to FIG. 1, and in addition provides a range of Business Application Modules 106, also known as "tools". These tools include, but are not limited to, a User Administration Application 106b, a Marketing Library Manager (MLM) 106c and a Website Manager (HWM) 106a. The Website Manager 106a has tools that include at least the following: configuration, inventory management, lead management, traffic reporting, asset library management, website management, and logging. The Marketing Library Manager 106c permits dealers to access a variety of digital multimedia assets that include pictures, logos, videos, audio or text from advertising agencies, OEMs, and other sources as provided through the platform.

Dealers can use the website manager to edit and publish in real time. Dealers can also establish various permission levels for staff members to permit them to access the system, and to make permitted modifications, based on the level of access allowed. Further, the platform permits input of third party content, from a dealer group, OEM advertising association, and optionally also from a host of the platform, in hosted applications. The Dealer can use third party applications as well, through use of the interfaces of the service framework.

Taking as an example the automotive hosted platform discussed above, the business platform infrastructure provides a system that allows dealer groups to provide whatever design elements they would like for their websites from any source (i.e. agencies, Web design firms, etc.) using host-provided tools. The dealer groups can then activate and manage those websites with common tools, and integrate all the elements together into one manageable package. The tools are provided through the Business Services in a consistent user interface.

The Hosted Website Manager for the business platform (HWM) is used to configure, save, publish and activate consumer-facing websites. Site editing operations are serviced by the EJB (Enterprise Java Bean) tier, including those in which media assets are being selected or manipulated for use in constructing a client's website. These services may also be used when installing an order for creating a new website.

Again, in the context of an automotive platform, or a platform in which many entities will use the same marketing assets, the invention includes a Marketing Library Manager (MLM), as discussed above, which is the source for all digital marketing assets such as images, video, audio, and text content for any application or website that is developed for the business platform. The MLM is preferably organized hierarchically in libraries and folders. The media assets are managed in a media repository, and may be published to a "live" asset area in a shared file system before general use in applications, on constructed sites, or in the Website Manager. The MLM services preferably provide an abstraction layer independent of any underlying repository storage mechanism. This enables better integration of external content.

In the same context, the MLM services are preferably integrated with Artesia TEAMS (a product and trademark of Artesia), or another suitable digital asset management system. Clearly, other asset and content management back-ends can also be integrated with the business platform.

The MLM user interface verifies the credentials of the logged-in user to determine which media libraries can be accessed and the extent of use permitted, as explained below. Website Manager and the design tools use the MLM services for adding new content or modifying existing content on consumer-facing websites.

As will now be explained, the platform of the invention controls information access and degree of manipulation through a Business Entity Management core service module that is based on (1) business entity association with other business entities mimicking real life relationships and information needs, based on user roles; (2) the role assigned to a user; and (3) the configuration of the relevant business objects to allow access to or manipulation by the user.

A "business entity" in the business platform of the invention is anyone or any corporation, partnership or other entity that can access the business platform applications or data through a user. Thus, for example, a dealer, dealer group or OEM in an automotive platform would be a business entity, while a manager of sales (a user "role") might be a designated user that has permission through his/her assigned role within the business entity to access the platform. A business entity in the platform of the invention is part of a network of associated business entities that mimics real life business relationships between these entities. The network is contextual in that it is role dependent. Thus for each user role, the network may be different from other user roles due to the nature of actual business relationships and information needs. Thus, whenever a new business entity is added to the platform, all that must be established are the roles of the users, and the other entities already in the network with which it will have direct relationships through its normal course of business. This permits ease of adding new business entities to the system by establishing its "associations" in the network, for each role. "Associations" represent the relationships between business entities in the platform; for example, OEMs, dealer groups, and dealers, in the automotive platform context. The business platform must know business entity associations to control access to and permitted use of business objects ("pieces of information") in libraries, assets, and configured active content across those associations. Active content is defined as content that can be configured by an administrator. Permitted "uses" or "manipulations" of information accessible via the platform include viewing only, editing, creating, modifying, supplementing, report generation, and the like. Business entities, like users, can also be assigned roles, and each business entity can perform dual positions in the business entity, association, and role system. This provides a flexible way of managing the interactions between the various business objects and actors, as explained below.

Figure 3:
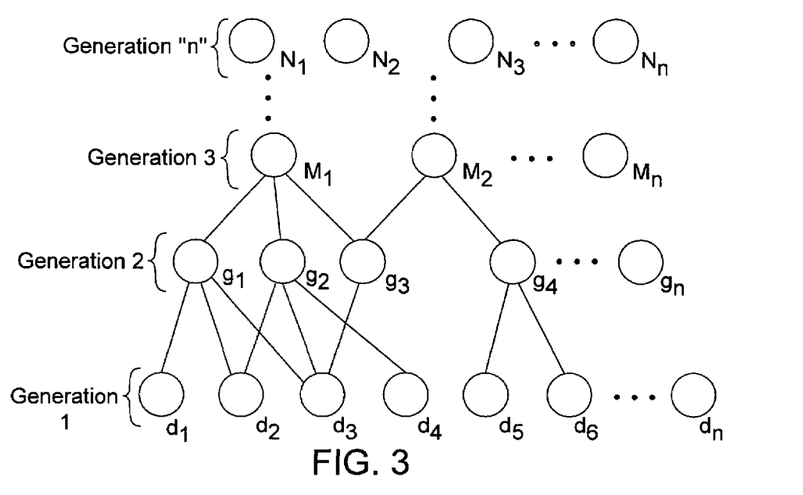
FIG. 3 is a representation of an example of a business association network mimicking business entity relationship network, in accordance with the invention, for a particular user.

With reference to FIG. 3, an illustrative example of the role dependent networked business relationships that are emulated in the business platform of the invention, there are shown a number of business entities (represented by circles) arrayed in series of "generations". At the lower level, there is a group of business entities designated generation 1. Moving up the diagram, the next generation is generation 2, and so forth up to generation n. Thus, the business platform can accommodate a large range of generations that have business associations with each of its neighboring generations, represented by the linking lines. For ease of explanation, assume that the business platform is a hosted platform used in the automotive business area. In this case, the business entities shown at the level of generation 1 may be visualized as automotive dealers. The business entities shown at the level of generation 2 may be regarded as regional dealership groups; and the business entities at generation 3 may be viewed as OEMs. Clearly, the platform can accommodate more than 3 generations, but these 3 generations will suffice to explain how the business relationship configuration is used to control information access and use and one of skill in the art can readily extend this to include more generations for a particular application.

Note that dealer d2 belongs to both dealer group g1 and dealer group g2. This is a real life situation, in which a single dealer may be franchised to sell 2 different product lines, for example Saab and Volkswagen cars. Accordingly, dealer 2 will have a business relationship with 2 regional dealer groups, as shown by the association between them in FIG. 3. Likewise, as shown in the diagram, dealer d3 has associations with 3 dealer groups (g1, g2 and g3), because it sells 3 different product lines, and is therefore affiliated with 3 different dealer groups. On the other hand, dealers d1 and d5 each only associate with a single dealer group, since they have only 1 franchise each.

Note further that at the second generation level, some of the regional dealer groups g1, g3, and g3 have associations with each other. This association between dealer groups is also based on business relationships. For example, one dealer group may be based in Seattle, while another might be based in Denver, but both dealer groups sell the same line of automobiles. Accordingly, it might be necessary and desirable for an exchange of information regarding sales, marketing and other business information regarding sales of an automobile product line in the two regions. As a general rule, such associations between colleagues of the same generation can be established for any generation, based on the existing business relationships.

At the generation 3 level, the automobile manufacturers, tire manufacturers, and other suppliers of original equipment (OEMs) have associations with the regional dealer groups, and may have access to certain information of these. However, each OEM is restricted to access only information relating to its products, and not product lines of other OEMs, as explained below, through configuration of business objects and taking into account user roles.

For the sake of simplicity, one can view the above described "generational" business relationships as "parent-child" relationships, where the OEMs are parents, the dealer groups are children, and the dealers are "grandchildren". The dealers stand as "children" to the dealer group "parents".

Referring to FIG. 3, it is also apparent that there is in this example no direct relationship shown between generation 3 and generation 1. The only communication is through generation 2. This not always the case. In many circumstances, depending upon user role, direct associations between generations 1 and 3 is a reality of the actual business relationship. The example of FIG. 3 was added to illustrate the role-dependent nature of the networked associations. Thus, for example, a user at an OEM might want access to dealer inventories for production scheduling reasons. This can be effected through direct information transfer from dealer to OEM once the association between dealer and OEM is present in the platform for the user seeking the information. Note further that the network is fully recursive; so that, for example, when OEM M1 seeks permitted information from dealer group g1, it also has access to permitted information through g1 to information from d1. This recursiveness is a significant feature of the invention that simplifies the adding of new business entities to the networks: only immediate or closest business relationships must be mimicked by associations with already existing entities in the network, other associations result automatically from prior established associations of the already existing business entities. Thus if d3 is newly added, only associations with g1, g2, and g3 need be specified. The associations with M1 result automatically by recursion.

Figure 4:
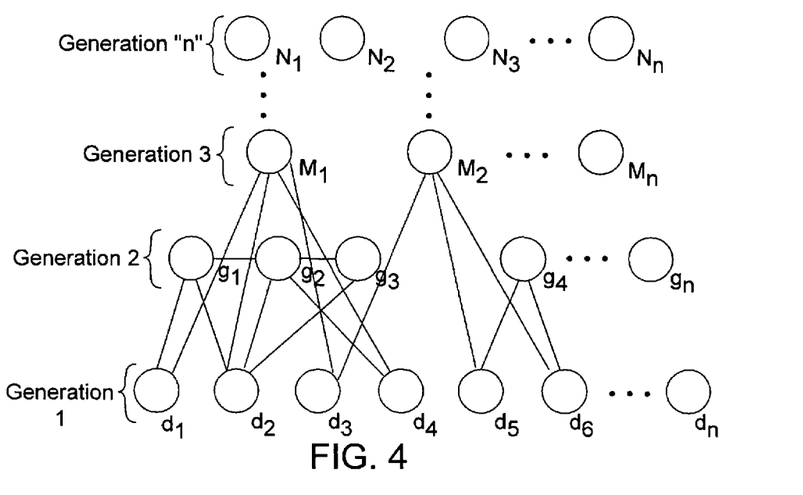
FIG. 4 is a representation of another example of a business association network mimicking business entity relationship network, in accordance with the invention, for another user.

The above discussion, relating to FIG. 3, sets forth a basic notion of associations between the business entities, in accordance with the invention. However, as explained before, business entity associations are also contextual in the sense that they are dependent upon the role of the user ("role-dependent") within the business entity. Therefore, for example, the networked association illustrated in FIG. 3, may for example relate to the role of an accounting manager for one of the dealer groups, or for any one of the other generations shown. The information requirements of a marketing manager of one of the business entities might be quite different, and could be illustrated as shown in representative diagram FIG. 4, for example. In this FIGURE, it can be seen that there are now direct associations between generation 3, the OEMs in the automotive context, and generation 1, the dealers. This direct association might be necessary for the dealers to update digital multimedia images and other information from the OEM's MLM for use on dealer websites. Further, the OEMs might have an interest in the nature of automobiles being configured by consumer users, using configurators on the dealer websites. This kind of information might provide the OEMs with valuable insights as to consumer preferences. Accordingly, such direct associations might be both necessary and desirable, and may reflect real life relationships.

From the foregoing, it should now be apparent that user role plays an important part in establishing the associations between business entities for persons in that particular role; i.e. the associations are role based. Thus, each business entity will have as many networked associations as it has user roles; one of these networks corresponding to each of its roles that has access as a user.

The platform of the invention also controls access to information, as most broadly defined, through configuration of its "business objects". Thus, each of the business application modules, and their content, and all content in data bases of business entities that are intended to be shared, are business objects. The information to be shared is not narrowly defined or restricted in the invention, but can be any information in the system. In other words, the business objects representing information or data are abstract concepts in this context.

In the invention, each of the business objects is configured for permission or denial of access depending upon the role of the user seeking access. Further, in the event access is not denied, but is granted, access can be restricted in several ways by object configuration. For example, the business object may be configured to deny access completely to a user with a particular role or to permit "view only" access, or access to manipulate, and manipulation can be restricted to edit, modify, supplement, create, and/or delete. Further, access may be restricted, based on user, and business object configuration, to permit or deny the user the right to aggregate information to generate the reports that include the particular business objects. Thus, for example a parent (e.g. dealer group) might have access to all children (dealers in its group) inventory and can run a report showing all of this. But, the child might or might not have permission to generate or view the same report. In some instances, a user may only be allowed to see part of a report or to generate a report based on only certain information allowed for that user. According to the invention, that there are parts of the report or information withheld from this user, would not be apparent to the user. Users of each business entity within each franchise could receive permissions to view, edit, create, modify or supplement all, some, or none of the applications, reports, or website information associated with their own business entity's franchise. In particular cases, users from non associated business entities may also be expressly granted roles and permissions bypassing any (lack of) actual business relationship. This is not common, however.

Accordingly, the platform of the invention uses a flexible range of parameters based on business entity association (mimicking real life relationships and information needs) in the context of user role, and business object configuration to control access to information of all kinds, in the same way that businesses in the real world would want to structure their informational relationships.

When a user logs into the system, the usual precautions are taken to authenticate the user by login ID and password. Once the user is logged in, and his/her role is identified, the user can look at and manipulate all information available to his/her role and business entity to which he/she belongs, without any appearance via the user interface that not all the system information available is available to the user. The user can access information to which it is allowed access (based on business entity and role), and can manipulate it to the extent permitted to its role.

The addition of new business entities is also straightforward. Once all roles of the new entity are established, and relationships for each role with its parent, child and sibling business entities, associations are set up for each role. This automatically sets up other relationships in the network based on prior associations of the parent, siblings, and children because the system is fully recursive, as explained above. In some instances, direct association outside of the "parent child sibling" context must be added, e.g. to a grandparent (as in the case of dealer to OEM).

The business platform Business Entity Management, as described above, ensures that business entity users only receive permission to access (to view, modify, edit, supplement, create, etc.) applications, data, and websites (all regarded as "information" made up of "business objects") that are appropriate for their assigned role within the entity to which they belong. As can be understood from the foregoing, once created, business entities become the nexus from which almost all resources are referenced. These resources include users, applications, asset libraries, websites and product packages.

The platform also includes an optional Collection Management Sub-system (CMS) that provides the necessary functionality involved in creating and managing collections. A "collection" is any set of business entities which share a common property, like the new car franchised dealers of an OEM's dealer network. The CMS allows the business platform to "collect" groups of products under (or in association with) certain business entities. An actor will create a collection of product packages or products in order to perform actions in aggregate via the platform. For example, in the automotive context, an actor may create a collection that contains all the Toyota-endorsed websites in order to share a Toyota OEM library. Collections make it possible to take action (i.e. updating a website design, or deploying a new application) across an entire OEM or dealer group dealer network (or any subset) by a central authority.

WebEngine (a product and trademark of Cobalt Group, Inc. of Seattle, Wash.) or an equivalent may be used, as the underlying Core Service used by Website Manager, tool for maintaining and publishing websites. WebEngine is designed to offer core services and persistence for any application or subsystem that interacts with website content management.

In addition, a Design Management Tool provides an interface to import, update and delete design-related information. Design components may vary depending upon the industry, but all these are preferably managed through the tool and include the following, in the automotive context:

Designs
Design Families
Navigation Templates
Page Layouts
Page Types
Footers

Designs can be created by any party with access to the Design Management Tool. Designs created are preferably output as XML DTD documents and loaded into the WebEngine for publishing. Sites published based on a design can be edited, regardless of creator, through the Website Manager.

The platform also has a User Management Tool, an administration application that allows for the creation of first administrator user and first user and also provides the capability to search for and edit users and user profiles. Once these users are created, the administrator can create and manage additional and existing users.

An Order Management System is responsible for receiving order information, for example from a preexisting legacy system using the Enterprise Application Integration services (EAI), and saving it in the business platform system. The order information is used to initialize the site and customize website products and dealer tools.

The business platform is, as explained above, designed to integrate seamlessly into legacy systems within an enterprise using enterprise application integration APIs. The business platform's EAI capabilities are used for:

Communicating via the business platform Service framework. The business systems use EAI to notify Business Entities of relationships and associations that exist between them, and to broker data and provide process integration with other applications.

SalesLogix (a product and trademark of Interact Commerce Corporation, a Division of Best Software of Scottsdale, Ariz.) is the preferred source for customer information. Utilizing EAI, the business platform uses the account information from SalesLogix to create business entities. Creating and updating accounts and contacts are the triggers for the transfer of data.

The Order Tracking Service, preferably built on an Oracle or other equivalent database, is used to track the status of orders. This service notifies other business platform services of changes in the status of an order via EAI.

Business partners and other users of the business platform-based systems have a multitude of business to business ("B2B") integration options. Integration services within the business platform accept adapters conforming to Content Management Systems (CMS), such as for example, Vignette (a product and trademark of Vignette of Austin, Tex.) and TeamSite (a product and trademark of Interwoven of Sunnyvale, Calif.). Integration packages, such as BusinessWare (a product and trademark of Vitria of Sunnyvale, Calif.) and webMethods (a product and trademark of webMethods of Sunnyvale, Calif.), and the like are similarly accommodated. Using the business platform in this manner provides a wide range of possibilities, including the ability to propagate personalization and website designs from commercial CMSs to the business platform-based systems.

In the automotive context, used as an example to explain and highlight features of the platform of the invention, the business platform provides a robust, flexible system that allows dealer groups and dealers to manage their online business easily in a rapidly evolving world of technology. The business platform architecture uses software systems to provide security, availability, scalability, extensibility, and ease of use, while at the same time allowing for rapid growth and investment protection. The elements that make up the business platform provide business entities with many options to build, distribute, and manage their e-business solutions.

Figure 5:
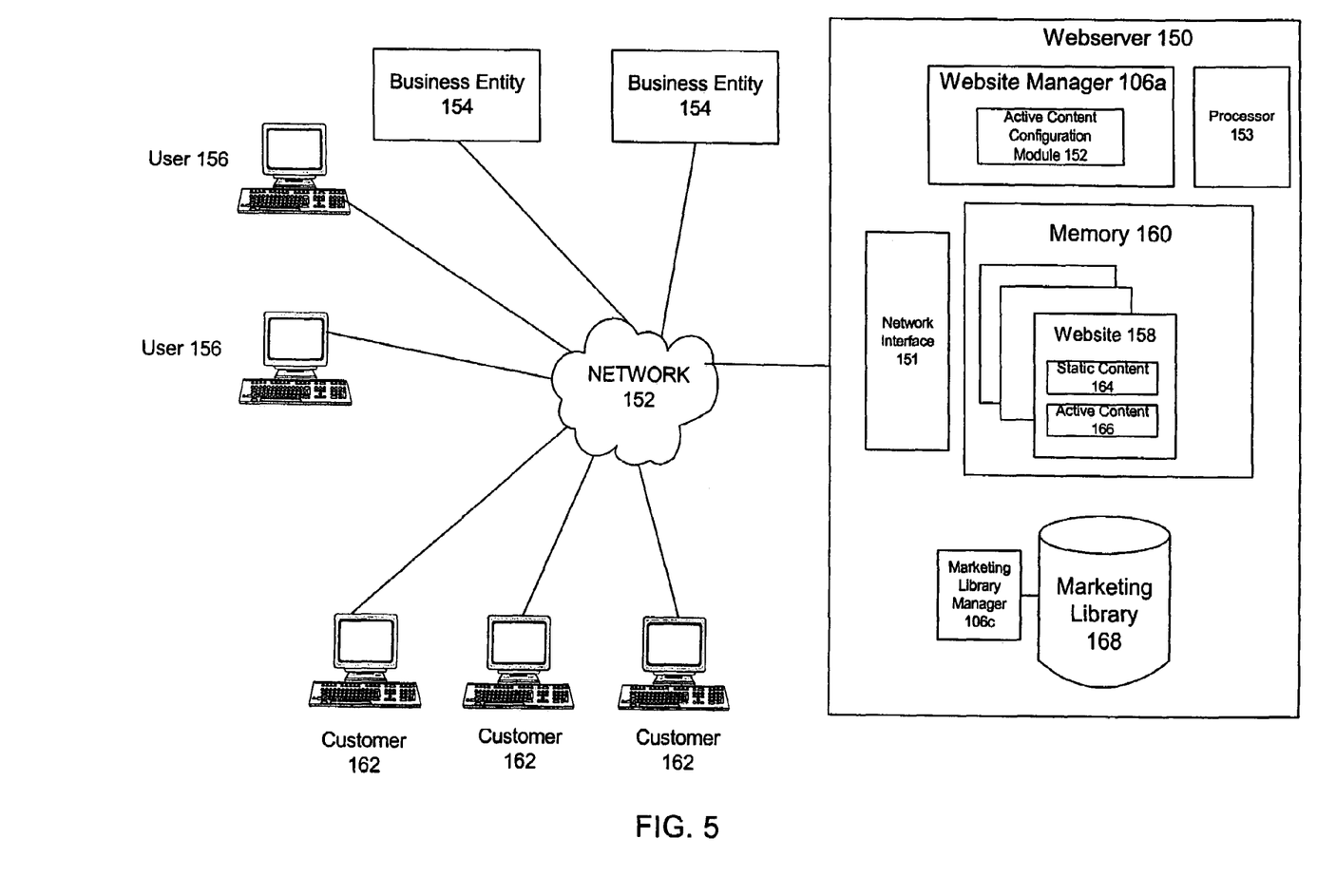
FIG. 5 is a representation of a system for providing website access and enabling configuration of website content.

Referring to FIG. 5, a representation of a network-based system 148 for providing web content for participating business entities is shown. The system 148 includes a web manager 106a resident in a webserver 150. The web manager 106a may be implemented as computer readable instruction code to perform functions of the present invention, and as such, be stored in a memory configuration. A web manager 106a may also be implemented in hardware as is known in the art. The webserver 150 includes a network interface 151 to enable communication with a network 152, such as a global computer network that is commonly referred to as the Internet. However, the network 152 may also be an intranet such as LAN or WAN. The webserver 150 includes a processor 153 to enable operation in accordance with the present invention.

Business entities 154 and individual users 156 communicate with the webserver 150 through the network 152 to initialize and modify content available to customers. A business entity 154 may have an assigned administrator for accessing the webserver 150 or a user 156 may be a designated administrator.

The webserver 150 hosts websites 158 which are stored in a memory 160 for access by customers 162. A customer 162 is defined broadly and may be an end consumer of products or services or another user 156 of the system 148. The webserver 150 includes the website manager 106a to process operations relating to the servicing and editing of the websites 158. The website manager 106a may be implemented as computer readable code that is operated by the processor 153. A website 158 includes static content 164 and active content 166 that may collectively be referred to as web content. Active content 166 includes identifiable objects that may be modified by users. Except upon initial creation, static content 164 remains unchanged. A template may define the layout for the static content 160 and the location of active content 166 relative to the static content 160.

The website manager 106a includes a tool referred to herein as an active content configuration module 168 to enable editing of active content 166. The website manger 106a authorizes user login to the webserver 150 to view and modify active content 166 for a chosen website 158 if the user 156 has permission. The active content configuration module 168 governs which users 156 have permission to edit a website 158 and control how the website 158 is ultimately rendered and viewed by customers 162.

The webserver 150 includes a marketing library manager 106c that serves as a database manager for a marketing library 168. The marketing library 168 contains media such as alphanumeric text, graphics, videos, or audio. The media can be developed by the business entities 154 or be received by an outside source. The marketing library 168 may include templates that define static content 164 and the location of one or more active content 166 relative to the static content. In one implementation, a template may designate cells where active content 166 is placed. Active content 166 may also be selected from the available media and inserted in an appropriate cell in a website 158.

When a user 156 requests or authorizes creation of a website 158, the active content configuration module 152 allows the user 156 to select static content 164 from the media in the marketing library 168 or select a pre-developed template. The marketing library manager 106c locates and retrieves the requested media or template from the marketing library 168. A user 156 may configure static content 164 for a layout and define locations for cells for active content 166. Alternatively, a template may "lock" the static content 164 thereby preventing a user 156 from altering the layout. A user 156 then initially selects active content 166 for placement in a website 158, such as by copying the active content 166 to cells. The initial values for the active content 166 are chosen as default values.

Users 156 may subsequently edit default values for any number of reasons. In one example, a group of business entities may use a common website layout. However, a displayed website 158 needs to be specific to one entity based on a geographic locations, legal considerations, pricing structures, and so forth. Thus, a participating group may need to edit an active content 166 because local taxes, shipping, maintenance, or other overhead considerations affect the value. In another example, an active content 166 may be a legal disclaimer that needs to be modified based on the local legal policies in effect. As can be appreciated, an active content 166 may need to be modified by an entity or a group of entities for any number of reasons.

The active content configuration module 152 allows a user 156 to log in and, depending on authorization and permission, edit active content 166 on a website 158. A user 156 may be an administrator for a business entity or for a group of business entity. Active editing of values is shared between participating entities and groups of the system 148. As such, different users 156 from different entities and groups may access and edit values as permitted.

Users 156 may elect to retain the values open so that subsequent users 156 may edit the values. Alternatively a user 156 may wish to lock a value to prevent editing. The configuration module 152 operates on precedence assigned to the different entities and groups to determine control of locked values. Thus, a higher precedence may change a value locked by a lower precedence, and a higher precedence lock is not modifiable by a lower precedence lock. Given the complex natures of business entities and their relationships, pre-assigning precedence greatly facilitates a determination of whether one entity overrides another entities lock.

Figure 6:
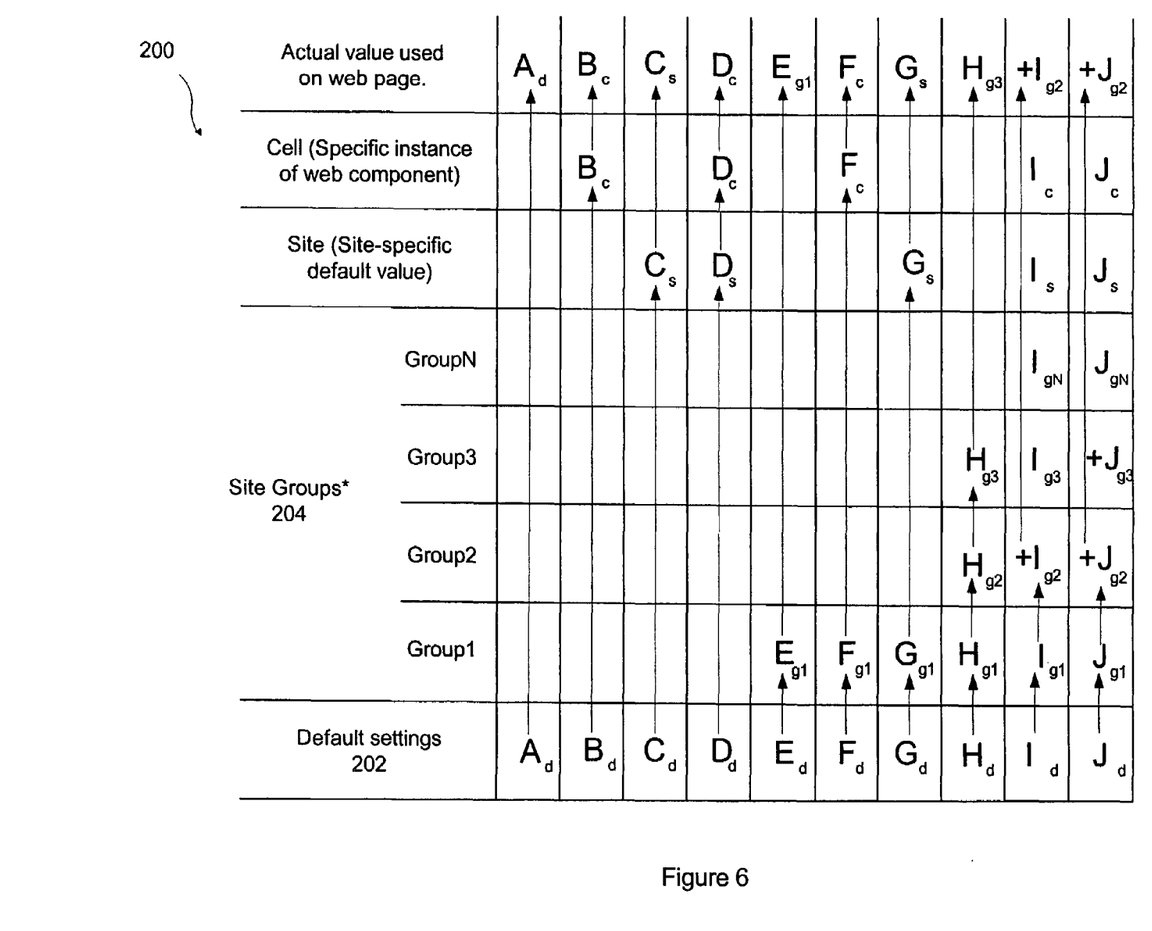
FIG. 6 is a table illustrating configuration options for values displayed on websites.

Referring to FIG. 6, a table 200 is shown illustrating a methodology for determining the values of active content 166 accessible on a website. The active content 166 may be alphanumeric text, graphics, video, audio or other displayable information that may be formatted within a web document. Entities participating in a family website may need to display values in their respective website. However, the values may vary for a number of reasons. Thus, a value of an active content must be modifiable according to the specific website. Furthermore, a methodology based on precedence enables restriction and control of values available on websites.

Default values 202 are initially created with a corresponding website 158 and the website configuration module 152. Values shown throughout the table 200 are accompanied by a subscript to indicate the provider of the setting. Providers are site groups 204 that are participating in the development of a website 156. A site group 204 includes one or more business entities. Participation in a site group 204 may be based on a number of relational factors such as franchise relations, contractual relations, sponsorship, production relations, and so forth. A user 156 acts on behalf of a site group 204 to access and modify values 200.

Default values 202, A-J, have a subscript "d" to indicate their default setting. Subscripts "g1, g2, . . . , gn" indicate that a user 156 of a corresponding site group provided a new setting upon modification of the value. Thus, values E-J have a subscript "g1" to indicate that group 1 provided a new value. A "+" symbol in front of a value indicates that the value is locked or immutable. A locked value may be overridden by another locked setting of higher precedence. Values specified by multiple site groups are evaluated based on an order of precedence established for the groups. In FIG. 8, the precedence order goes down as the group number increases.

In locking, a group with the highest precedence can override a lock by a group of a lower precedence. Value I is locked by group 2. Although group 3 and group N have different values for I and J, the precedence of group 2 prevents the unlocking and modification of I and J.

For unlocked values, a value supplied by a lower precedence group may be used. Value H is changed by group 1, group 2, and finally group 3. Because value H was never locked, the last chronological modification determines the value displayed on the website.

Subscript "s" indicates that a site-specific default value is provided. The website configuration module 152 may automatically modify values based on predetermined site values. In FIG. 6, the values C and G are modified to a site-specific default value. In one implementation of the present invention, locked values override the site-specific default values. This is shown where I and J have locked values by site group 2. Alternatively, site-specific values may be given precedence as with site groups. Site-specific values would then operate similar to the site groups in overriding previously established locks.

Subscript "c" indicates a specific instance of a web component providing a value, as shown with values B, D, F, I, and J. A web component may override a site-specific value. In the implementation shown, a web component does not override site group locks. However, in alternative embodiments, a web component may be assigned a precedence and operate similar in priority to site groups.

Default values for active content are modifiable by participating site groups and automatically replaced by predetermined site-specific values and web components. Values are locked at the discretion of site groups. The control of values is maintained by the precedence ranking of participating site groups. Thus, a superior precedence will retain ultimate control over values. In this manner, an OEM may determine the values resident on a website regardless of other participating business entities such as group dealerships, retailers, and so forth.

It will be obvious to those having skill in the art that many changes may be made to the details of the above-described embodiments without departing from the underlying principles of the invention. The scope of the present invention should, therefore, be determined only by the following claims.

The invention claimed is:

1. A server accessible over a network and hosting web content containing static content and active content, the server comprising:
   a network interface for communicating with the network;
   a memory to store websites containing static content and active content;
   a website manager to render websites with the static content and active content in fixed locations relative to one another, the website manager including an active content configuration module to perform a method comprising:
      authorizing a user to access the website manager;
      receiving a user request to modify a selected active content;
      determining if the selected active content has a locked value; and preventing the assignment of a new value to the selected active content upon determining that the selected active content has a locked value
      wherein the active content configuration module further performs:
   comparing a precedence of the user request to a precedence of the locked value; and
   assigning a new value to the selected active content if the precedence of the user request is greater than the precedence of the locked value.

2. The server of claim 1, further comprising a marketing library including media content.

3. The server of claim 2, further comprising a marketing library manager to access and retrieve media content in response to user requests.

4. The server of claim 2, wherein the marketing library includes templates defining locations for static content and active content.

5. The server of claim 2, wherein the new value is representative of an active content stored in the marketing library.

6. A method for configuring active content in a website for modification by users participating in a business entity management system, comprising:
   creating a website including static content and an active content in a fixed locations relative to the static content;
   authorizing a user as a participant;
   receiving a user request to modify a value of the active content;
   determining if the active content has a locked value; and
   preventing the assignment of a new value to the active content upon determining that the active content has a locked value and further comprising:
      comparing a precedence of the user request to a precedence of the locked value; and
      assigning a new value to the selected active content if the precedence of the user request is greater than the precedence of the locked value.

7. The method of claim 6, wherein creating a website includes incorporating a template that determines the static content and position of the active content.

8. The method of claim 7, wherein creating a website includes accessing a library having the template stored therein and selecting the template.

9. The method of claim 6, wherein assigning a new value includes accessing a library and selecting a new value representative of an active content stored in the library.

10. A computer readable medium containing computer readable instruction code for performing a method for configuring active content in a website for modification by users participating in a business entity management system, comprising:
    creating a website including static content and an active content in a fixed locations relative to the static content;
    authorizing a user as a participant;
    receiving a user request to modify a value of the active content;
    determining if the active content has a locked value; and
    preventing the assignment of a new value to the active content upon determining that the active content has a locked value
    wherein the method further comprises:
       comparing a precedence of the user request to a precedence of the locked value; and
       assigning a new value to the selected active content if the precedence of the user request is greater than the precedence of the locked value.

11. The computer readable medium of claim 10 wherein creating a website includes incorporating a template that determines the static content and position of the active content.

12. The computer readable medium of claim 11, wherein creating a website includes accessing a library having the template stored therein and selecting the template.

13. The computer readable medium of claim 10, wherein assigning a new value includes accessing a library and selecting a new value representative of an active content stored in the library.

14. A method for modifying active content values in a website, comprising:
    assigning precedence to a plurality of site groups;
    creating a default active content value and static content;
    receiving a user request from a site group to modify a value of the active content;
    determining if the active content value is unlocked;
    modifying the active content value if the active content value is unlocked; and
    comparing the precedence of the user request to the precedence of the active content value if the active content value is locked and modifying the active content value if the precedence of the user request is greater than the precedence of the active content value.

15. The method of claim 14, further comprising modifying the active content value with a value provided by a web component if the active content value is unlocked.

16. The method of claim 14, further comprising modifying the active content value with a site-specific value if the active content value is unlocked.

17. The method of claim 14, wherein creating a default active content value and static content includes incorporating a template to define the static content and position of the default active content value.

18. The method of claim 14, wherein modifying the active content value includes accessing a library and selecting a new value representative of an active content stored in the library.

19. A computer readable medium containing computer readable instruction code for performing a method for modifying active content values in a website, comprising:
    assigning precedence to a plurality of site groups;
    creating a default active content value and static content;
    receiving a user request from a site group to modify a value of the active content;
    determining if the active content value is unlocked;

modifying the active content value if the active content value is unlocked; and comparing the precedence of the user request to the precedence of the active content value if the active content value is locked and modifying the active content value if the precedence of the user request is greater than the precedence of the active content value.

20. The computer readable medium of claim 19, wherein the method further comprises modifying the active content value with a value provided by a web component if the active content value is unlocked.

21. The computer readable medium of claim 19, wherein the method further comprises modifying the active content value with a site-specific value if the active content value is unlocked.

22. The computer readable medium of claim 19, wherein creating a default active content value and static content includes incorporating a template to define the static content and position of the default active content value.

23. The computer readable medium of claim 19, wherein modifying the active content value includes accessing a library and selecting a new value representative of an active content stored in the library.

* * * * *

UNITED STATES PATENT AND TRADEMARK OFFICE
CERTIFICATE OF CORRECTION

PATENT NO.       : 7,039,704 B2
APPLICATION NO.  : 10/350796
DATED            : May 2, 2006
INVENTOR(S)      : Lee M. Davis, Robert M. Spearman and Robert C. Combs It is certified that error appears in the above-identified patent and that said Letters Patent is hereby corrected as shown below:

In Column 3, Line 4, change "are" to --is--.

In Column 5, Line 29, change "mimics" to --mimic--.

In Column 5, Line 39, after "amend", insert --,--.

In Column 7, Line 44, after "may", insert --be--.

In Column 7, Line 63, after "Service", insert --Module--.

In Column 7, Line 64, after "Service", both times it occurs, insert --Module--.

In Column 8, Line 20, before "Website", insert --Hosted--.

In Column 8, Line 21, before "Website", insert --Hosted--.

In Column 8, Line 29, replace "website" with --Hosted Website--.

In Column 8, Line 49, after "Manager", insert --106a--.

In Column 8, Line 59, after "Manager", insert --106c--.

In Column 8, Line 67, before "Website Manager", insert --Hosted--.

In Column 9, Line 1, after "Manager", insert --106a--.

In Column 9, Line 13, replace "Website Manager" with --The Hosted Website Manager 106a--.

In Column 12, Line 47, after "Management", insert --module--.

In Column 13, Lines 5-6, replace "group dealer network" with --group network--.

In Column 13, Line 9, replace "Core Service used by Website Manager" with --Core Service tool used by the Hosted Website Manager 106a--.

In Column 13, Line 30, replace "Website Manager" with --Hosted Website Manager 106a--.

In Column 14, Lines 25-26, replace "web manager" with --Website Manager--.

UNITED STATES PATENT AND TRADEMARK OFFICE
CERTIFICATE OF CORRECTION

PATENT NO.         : 7,039,704 B2
APPLICATION NO.    : 10/350796
DATED              : May 2, 2006
INVENTOR(S)        : Lee M. Davis, Robert M. Spearman and Robert C. Combs It is certified that error appears in the above-identified patent and that said Letters Patent is hereby corrected as shown below:

In Column 14, Lines 26-27, replace "web manager" with --Website Manager--.

In Column 14, Line 30, replace "web manager" with --Website Manager--.

In Column 14, Line 61, replace "manger" with --manager--.

In Column 15, Line 31, before "geographic", insert --a--.

In Column 15, Line 44, replace "entity" with --entities--.

In Column 15, Line 58-59, replace "entities" with --entity's--.

In Column 16, Line 26, replace "8" with --6--.

In Column 17, Line 46, delete "a".

In Column 18, Line 7, delete "a".

Signed and Sealed this

Tenth Day of October, 2006

JON W. DUDAS
*Director of the United States Patent and Trademark Office*